(12) United States Patent
Moir et al.

(10) Patent No.: US 7,703,098 B1
(45) Date of Patent: Apr. 20, 2010

(54) TECHNIQUE TO ALLOW A FIRST TRANSACTION TO WAIT ON CONDITION THAT AFFECTS ITS WORKING SET

(75) Inventors: Mark S. Moir, Somerville, MA (US); Maurice Herlihy, Brookline, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1673 days.

(21) Appl. No.: 10/894,828

(22) Filed: Jul. 20, 2004

(51) Int. Cl.
*G06F 9/46* (2006.01)
*G06F 12/00* (2006.01)

(52) U.S. Cl. .................. 718/101; 718/100; 711/147; 711/148; 711/150; 711/152; 711/153

(58) Field of Classification Search ............ 718/1, 718/100, 101, 102, 103, 104, 105, 106, 107, 718/108; 711/129, 130, 131, 137, 147–155
See application file for complete search history.

(56) References Cited

U.S. PATENT DOCUMENTS

| | | |
|---|---|---|
| 4,584,640 A | 4/1986 | MacGregor et al. |
| 4,847,754 A | 7/1989 | Obermarck et al. |
| 5,222,217 A | 6/1993 | Blount et al. |
| 5,224,215 A | 6/1993 | Disbrow |
| 5,241,675 A | 8/1993 | Sheth et al. |
| 5,319,778 A | 6/1994 | Catino |
| 5,369,757 A | 11/1994 | Spiro et al. |
| 5,428,761 A | 6/1995 | Herlihy et al. |
| 5,657,474 A | 8/1997 | Taine et al. |
| 5,701,432 A | 12/1997 | Wong et al. |
| 5,742,785 A | 4/1998 | Stone et al. |

(Continued)

FOREIGN PATENT DOCUMENTS

EP 0 366 585 5/1990

(Continued)

OTHER PUBLICATIONS

Prakash, Sundeep et al,. "Non-Blocking Algorithms for Shared Queues Using Compare-and-Swap," IEEE Transactions Computers, vol. 43, No. 5, pp. 548-559, May 1994.*

(Continued)

*Primary Examiner*—Meng-Ai An
*Assistant Examiner*—Abdullah Al Kawsar
(74) *Attorney, Agent, or Firm*—Robert C. Kowert; Meyertons, Hood, Kivlin, Kowert & Goetzel, P.C.

(57) ABSTRACT

By exploiting an early release facility that may be provided by certain transactional memory designs, we allow for transaction software constructs that wait on removal (or satisfaction) of a condition that would otherwise result in transaction abort. Absent exploitation of such a such a facility, the act of checking the condition would typically introduce a corresponding location into the read set of the transaction, and a subsequent modification of that location that removed (or satisfied) the condition, would result in abortion of the blocked transaction. By exploiting an early release facility such as described herein, a transaction may release the location (or locations) corresponding the condition, retry, and once the transient condition is removed (or satisfied), complete and commit. In this way, computation effort may be conserved while still employing a conceptually simple and convenient coordination facility.

41 Claims, 4 Drawing Sheets

U.S. PATENT DOCUMENTS

| | | | |
|---|---|---|---|
| 5,926,835 A * | 7/1999 | Guidot et al. | 711/152 |
| 5,937,199 A | 8/1999 | Temple | |
| 5,960,436 A * | 9/1999 | Chang et al. | 707/101 |
| 5,974,438 A | 10/1999 | Neufeld | |
| 6,021,480 A | 2/2000 | Pettey | |
| 6,128,710 A | 10/2000 | Greenspan et al. | |
| 6,128,713 A | 10/2000 | Eisler et al. | |
| 6,144,965 A | 11/2000 | Oliver | |
| 6,178,423 B1 | 1/2001 | Douceur et al. | |
| 6,263,360 B1 | 7/2001 | Arnold et al. | |
| 6,360,219 B1 | 3/2002 | Bretl et al. | |
| 6,360,220 B1 * | 3/2002 | Forin | 707/8 |
| 6,366,932 B1 | 4/2002 | Christenson | |
| 6,425,048 B1 | 7/2002 | Kaganoi | |
| 6,449,673 B1 * | 9/2002 | Gupta | 710/240 |
| 6,460,124 B1 | 10/2002 | Kagi et al. | |
| 6,493,741 B1 | 12/2002 | Emer et al. | |
| 6,581,063 B1 | 6/2003 | Kirkman | |
| 6,651,146 B1 | 11/2003 | Srinivas et al. | |
| 6,675,192 B2 | 1/2004 | Emer et al. | |
| 6,681,226 B2 * | 1/2004 | Bretl et al. | 707/8 |
| 6,697,927 B2 | 2/2004 | Bonola | |
| 6,826,757 B2 | 11/2004 | Steele et al. | |
| 6,862,664 B2 | 3/2005 | Tremblay et al. | |
| 6,918,012 B2 | 7/2005 | Venkitakrishnan et al. | |
| 7,076,629 B2 | 7/2006 | Bonola | |
| 7,089,374 B2 | 8/2006 | Tremblay et al. | |
| 7,206,903 B1 | 4/2007 | Moir et al. | |
| 7,437,623 B2 * | 10/2008 | Larson et al. | 714/56 |
| 2001/0047361 A1 | 11/2001 | Martin et al. | |
| 2002/0069326 A1 | 6/2002 | Richardson et al. | |
| 2002/0087810 A1 | 7/2002 | Boatright et al. | |
| 2003/0066056 A1 | 4/2003 | Petersen et al. | |
| 2003/0079094 A1 * | 4/2003 | Rajwar et al. | 711/150 |
| 2003/0126186 A1 | 7/2003 | Rodgers et al. | |
| 2003/0140085 A1 | 7/2003 | Moir et al. | |
| 2003/0163494 A1 * | 8/2003 | Bender et al. | 707/204 |
| 2003/0174572 A1 | 9/2003 | Moir et al. | |
| 2003/0182462 A1 | 9/2003 | Moir et al. | |
| 2003/0182465 A1 | 9/2003 | Moir et al. | |
| 2004/0015510 A1 | 1/2004 | Moir et al. | |
| 2004/0015642 A1 * | 1/2004 | Moir et al. | 711/1 |
| 2004/0034673 A1 | 2/2004 | Moir et al. | |
| 2004/0153687 A1 | 8/2004 | Moir et al. | |
| 2004/0158549 A1 * | 8/2004 | Matena et al. | 707/1 |
| 2004/0162948 A1 * | 8/2004 | Tremblay et al. | 711/137 |
| 2005/0131899 A1 * | 6/2005 | Dvorkin et al. | 707/8 |
| 2006/0173885 A1 * | 8/2006 | Moir et al. | 707/101 |
| 2008/0098181 A1 * | 4/2008 | Moir et al. | 711/152 |

FOREIGN PATENT DOCUMENTS

| | | |
|---|---|---|
| EP | 0 466 339 | 1/1992 |
| WO | WO 86/00434 | 1/1986 |
| WO | WO 01/53942 | 7/2001 |
| WO | WO 01/53943 | 7/2001 |
| WO | WO 01/80015 | 10/2001 |
| WO | WO 03/060715 | 7/2003 |

OTHER PUBLICATIONS

Herlihy, M.P., et al., "Linearizability: A Correctness Condition For Con-Current Objects," *ACM Transactions On Programming Languages and Systems*, 12(3):463-492, Jul. 1990.

Herlihy, M.P., "Wait-Free Synchronization," *ACM Transactions On Programming Languages and Systems*, 11(1):124-149, Jan. 1991.

Massalin, H., et al., "A Lock-Free Multiprocessor OS Kernel," Technical Report TR CUCS-005-9, Columbia University, New York, NY, 1991, 21 pages.

Massalin, Henry, "Synthesis: An Efficient Implementation of Fundamental Operating System Services," Dissertation submitted in partial fulfillment of the requirements for the Degree of Doctor of Philosophy in the Graduate School of Arts and Sciences, Columbia University, New York, NY, online, 158 pages, 1992 [retrieved from the Internet on Jul. 13, 2001: URL:ftp://ftp.cs.columbia.edu/reports/reports-1992/cucs-039-92.ps.gz].

Bershad, B. N., "Practical Considerations For Non-Blocking Concurrent Objects," *Proceedings 13th IEEE International Conference on Distributed Computing Systems*, pp. 264-273. IEEE Computer Society Press, Washington, D.C., 1993.

Herlihy, M., "A Methodology for Implementing Highly Concurrent Data Objects," *ACM Transactions on Programming Languages and Systems*, 15(5):745-770, Nov. 1993.

Attiya, Hagit, et al., "Are Wait-Free Algorithms Fast?" *Journal of the ACM*, 41(4):725-763, Jul. 1994.

Lamarca, A., "A performance evaluation of lock-free synchronization protocols," *Proceedings of the 13th Annual ACM Symposium on Principles of Distributed Computing*, pp. 130-140, ACM Press, New York, NY, 1994.

Michael, Maged M. et al., "Simple, Fast, and Practical Non-Blocking and Blocking Concurrent Queue Algorithms," Proceedings of PODC, pp. 267-275, May 1996.

Attiya, H., et al., "Universal Operations: Unary versus Binary," *Proceedings of the 15th Annual ACM Symposium on Principles of Distributed Computing*, pp. 223-232, ACM Press, New York, NY, 1996.

Greenwald, M. B., et al., "The Synergy Between Non-Blocking Synchronization and Operating System Structure," *Proceedings of the 2nd Symposium on Operating Systems Design and Implementation*, pp. 123-136, Usenix Association, Berkeley, CA, 1996.

Afek, Y., et al., "Disentangling Multi-Object Operations," *Proceedings of the 16th Annual ACM Symposium on Principles of Distributed Computing*, pp. 111-120, Aug. 1997. Santa Barbara, CA.

Arora, N. S., et al., "Thread Scheduling for Multiprogrammed Multiprocessors," *Proceedings of the 10th Annual ACM Symposium on Parallel Algorithms and Architectures*, pp. 119-129, ACM Press, New York, NY, 1998.

Attiya, Hagit, et al., "Atomic Snapshots in O(n log n) Operations," *SIAM Journal on Computing*, 27(2):319-340, Apr. 1998.

Greenwald, M., "Non-Blocking Synchronization and System Design," PhD thesis, Stanford University Technical Report STAN-CS-TR-99-1624, Palo Alto, CA, Aug. 1999, 241 pages.

Agesen, Ole, et al.: "DCAS-Based Concurrent DEQUES," *SPAA 2000. Proceedings of the 12th Annual ACM Symposium on Parallel Algorithms and Architectures*, pp. 137 146, ACM Press, New York, NY, ISBN: 1-58113-185-2, 2000.

Detlefs, David L., et al., "Even Better DCAS-Based Concurrent Deques," *Lecture Notes in Computer Science*, vol. 1914, pp. 59-73, Springer-Verlag, Berlin, Germany, ISBN: 3-540-41143-7, 2000.

Afek, Yehuda, "Atomic Snapshots of Shared Memory," Journal of the ACM, vol. 40, No. 4, pp. 873-890, 1993.

Anderson, James H. et al., "Universal Constructions for Large Objects," *IEEE Transactions on Parallel and Distributed Systems*, vol. 10, No. 12, pp. 1317-1332, 1999.

Goodman, James R., et al., "Efficient Synchronization Primitives for Large-Scale Cache-Coherent Multiprocessors," *Proceedings of the Third International Conference on Architectural Support for Programming Languages and Operating Systems*, pp. 64-75, ACM Press, New York, NY 1989.

Harris, T., et al., "Language Support for Lightweight Transactions," *Proc. 18th Annual ACM SIGPLAN Conf. on Object-Oriented Programming Systesm, Languages, and Applications*, pp. 388-402, ACM Press, New York, NY, 2003.

Herlihy, M., et al., "Transactional Memory: Architectural Support for Lock-Free Data Structures," *Proc. 20th International Symposium in Computer Architecture*, pp. 289-300, IEEE Computer Society, Washington, D.C., 1993.

Lamport, Leslie, "A Fast Mutual Exclusion Algorithm," ACM *Transactions on Computer Systems*, vol. 5, No. 1, pp. 1-11, 1987.

Luchangco, Victor et al., "Nonblocking k-compare-single-swap," *Proceedings of the 15th Annual ACM Symposium on Parallel Algorithms and Architectures*, pp. 314-323, ACM Press, New York, NY, 2003.

Mellor-Crummey, J., et al., Algorithms for Scalable Synchronization on Shared-Memory Multiprocessors, *ACM Transactions on Computer Systems*, vol. 9, No. 1, pp. 21-65, Feb. 1991.

Moir, Mark et al., "Wait-Free Algorithms for Fast, Long-Lived Renaming," *Science of Computer Programming*, vol. 25, No. 1, pp. 1-39, Aug. 1995.

Moir, Mark, "Practical implementation of non-blocking synchronization primitives," *Proceedings of the Sixteenth Annual ACM Symposium on Principles of Distributed Computing*, pp. 219-228, ACM Press, New York, NY, 1997.

Moir, Mark, "Transparent Support for Wait-Free Transactions," *Proceedings of the 11th International Workshop on Distributed Algorithms*, pp. 305-319, Springer-Verlag, London, UK, 1997.

Moir, Mark, "Laziness Pays! Using Lazy Synchronization Mechanisms to Improve Non-Blocking Constructions," *Proc. 19th Annual ACM Symposium on Principles of Distributed Computing*, pp. 61-70, ACM Press, New York, NY, 2000.

Shavit, N., et al., "Software Transactional Memory," *Distributed Computing*, vol. 10, No. 2, pp. 99-116, Feb. 1997.

Treiber, R., "Systems Programming: Coping with Parallelism," IBM Technical Report RJ5118, Apr. 23, 1986.

Rajwar, et al. "Speculative Lock Elision: Enabling Highly Concurrent Multithreaded Execution", Proceedings of the 34th Annual ACM/IEEE International Symposium on Microarchitecture, Austin, TX, Dec. 2001, pp. 294-305.

Rajwar, et al. "Improving the Throughput of Synchronization by Insertion of Delays" Proceedings of the Sixth International Symposium on High-Performance Computer Architecture, Jan. 8-12, 2000, pp. 168-179.

Lance Hammond, Vicky Wong, Mike Chen, Brian d. Carlstrom, John D, Davis, Ben Hertzberg, Manohar K. Prabhu, Honggo Wijaya, Christos Kozrakis, and Kunle Olukotin; "Transactional Memory Coherence and Consistency" Computer Architecture, 2004. Proceeding. 31st Annual International Symposium on ; Jun. 2004; pp. 102-113.

Maurice Herlihy, Mark Moir, Victor Luchangco, William N. Scherer III; "Software Transactional Memory for Dynamic-Sized Data Structures"; Sun Microsystems, Inc.; Jul. 13-16, 2003; pp. 1-10.

Tim Harris and Keir Fraser; "Language support for lightweight transactions"; Conference on Object Oriented Programming Systems Languages and Applications, Proceedings of the 18th annual ACM SIGPLAN conference on Object-oriented programing, systems, languages; 2003; pp. 388-402; ACM Press.

Agesen, Ole et, al., "An Efficient Meta-Lock for Implementing Ubiquitous Synchronization," ACM SIGPLAN Notices, vol. 34 No. 190, pp. 207-222, Oct. 1999.

Prakash, Sundeep et al,. "Non-Blocking Algorithms for Concurrent Data Structures," Technical Report 91-002, University of Florida, Jul. 1, 1001 [URL: http://citeseer.ist.psu.edu/prakash91nonblocking.htm], pp. 1-40.

Shann, Chien-Hua et al,. "A Practical Nonblocking Algorithm for Shared Queues Using Compare-and Swap," Proceedings of the Seventh International Conference on Parallel and Distributed Systems p. 470, IEEE Computer Society, Washington, D.C., 2000, pp. 470-475.

Shavit, N., et al, "Elimination Trees and the construction of Pools and Stacks," Theory of Computing Systems, vol. 30, pp. 645-670, 1997.

Stone, Janice M., "A simple and correct shared-queue algorithm using Compare-and-Swap," Proceedings of the 1990 ACM/IEEE Conference on Supercomputing, pp. 495-504, IEEE Computer Society, New York, NY, 1990.

Valois, John D., "Lock-Free Linked Lists Using Compare-and-Swap," Proceedings of the Fourteenth ACM Symposium on Principles of Distributed Computing, pp. 214-222, ACM Press, New York, NY 1995.

Afek, Yehuda et al., "Long-Lived Renaming Made Adaptive", 18th Annual ACM Symposium on Principles of Distributed Computing, pp. 91-104, 1999.

Afek, Yehuda et al., "Wait-Free Made Fast", 27th Annual ACM Symposium on Theory of Computing, pp. 538-547, 1995.

Anderson, James H. et al., "Using Local-Spin k-Exclusion Algorithms to Improve Wait-Free Object Implementations", 12th Annual ACM Symposium on Principles of Distributed Computing, Nov. 1995 (revised 1996, 1997), pp. 1-29.

Attiya, Hagit et al., "An Adaptive Collect Algorithm with Application", Dept. of Computing Science, The Technion, Israel, May 10, 2001, pp. 1-20.

Barnes, Greg, "A Method for Implementing Lock-Free Shared Data Structures", 5th Annual ACM Symposium on Parallel Algorithms and Architectures, pp. 261-270, 1993.

Detlefs, David L. et al., "Lock-Free Reference Counting", 20th annual ACM Symposium on Principles of Distributed Computing, pp. 190-199, 2001.

Dice, David et al., "Mostly Lock-Free Malloc", ACM 2002.ACM SIGPLAN International Symposium on memory Management, Jun. 2002, pp. 163-174.

Herlihy, Maurice, "Dynamic-Sized Lockfree Data Structures", Sun Microsystems Technical Report SMLI TR-2002-112, Jun. 2002, pp. 1-18.

Herlihy, Mauriceet et al., "The Repeat Offender Problem: A Mechanism for Supporting Dynamic-Sized Lock-Free Data Structures", Sun Microsystems Technical Report SMLI TR-2002-112, Jun. 2002, pp. 1-27.

Herlihy, Mauriceet et al., "Obstruction-Free Synchronization: Double-Ended Queues as an Example", 23rd International Conference on Distributed Computing, May 2003, pp. 1-8.

Lamport, Leslie, "how to Make a Multiprocessor Computer that Correctly Executes Multiprocess Porgrams", IEEE Transactions on Computers, Sep. 1979.

Turek, John et al., "Locking without Blocking : Making Lock Based Concurrent Data Structure Algorithms nonblocking", 11th ACM SIGACT-SIGMOD-SIGART Symposium on Principles of Database Systems, 1992, pp. 212-222.

Martin, Paul et al., "DCAS-Based Concurrent Deques Supporting Bulk Allocation", Sun Microsystems, Inc. Technical Report SMI TR-2002-111, Oct. 2002, pp. 1-17.

Michael, Maged M. et al., "Safe Memory Reclamation for Dynamic Lock-Free Objects Using Atomic Reads and Writes", 21st Annual ACM Symposium on Principles of Distributed Computing, pp. 21-30, Jan. 2002.

Michael, Maged M. et al., "Non-Blocking Algorithms and Preemption-Safe locking on Multiprogrammed Shared memory Multiprocessors", Journal of Parallel and Distributed Computing, Mar. 1997, pp. 1-35.

Saks, Michael et al., "Optimal Time Randomized Consensus—making Resilient Algorithms Fast in Practice", 2nd ACM SIAM Symposium on Discrete Algorithms, pp. 362, 1991.

U.S. Appl. No. 09/547,288, filed Apr. 11, 2000 and naming as inventor(s) Shavit et al.

U.S. Appl. No. 09/547,290, filed Apr. 11, 2000 and naming as inventor(s) Shavit et al.

U.S. Appl. No. 09/710,218, filed Nov. 10, 2000 and naming as inventor(s) Harris, Timothy.

U.S. Appl. No. 09/837,671, filed Apr. 18, 2001 and naming as inventor(s) Detlfs et al.

U.S. Appl. No. 10/653,828, filed Sep. 3, 2003 and naming as inventor(s) Martin et al.

U.S. Appl. No. 10/669,948, filed Sep. 24, 2003 and naming as inventor(s) Dice et al.

U.S. Appl. No. 10/670,495, filed Sep. 24, 2003 and naming as inventor(s) Shavit et al.

U.S. Appl. No. 10/894,829, filed Jul. 20, 2004 and naming as inventor(s) Moir et al.

\* cited by examiner

TECHNIQUE TO ALLOW A FIRST TRANSACTION TO WAIT ON CONDITION THAT AFFECTS ITS WORKING SET

CROSS-REFERENCE TO RELATED APPLICATION(S)

This application is related to commonly-owned U.S. patent application Ser. No. 10/894,829, entitled "Using Transactional Memory with Early Release to Implement Non-Blocking Dynamic-Sized Data Structure," naming Mark S. Moir and Maurice Herlihy as inventors, and filed on even date herewith.

The application is also related to the following commonly-owned co-pending U.S. patent applications: application Ser. No. 10/439,911, filed 16 May 2003, now U.S. Pat. No. 7,216,202, which issued May 8, 2007, entitled "Method and Apparatus for Avoiding Locks by Speculatively Executing Critical Sections" and naming Shailender Chaudhry, Marc Tremblay and Quinn A. Jacobson as inventors; application Ser. No. 10/764,412, filed 23 Jan. 2004, now U.S. Pat. No. 7,089,374, which issued on Aug. 8, 2006, entitled "Selectively Unmarking Load-Marked Cache Lines during Transactional Program Execution" and naming Marc Tremblay, Quinn A. Jacobson, Shailender Chaudhry, Mark S. Moir and Maurice Herlihy as inventors; U.S. Pat. No. 7,206,903, which issued on Apr. 17, 2007, entitled "Method and Apparatus for Releasing Memory Locations During Transactional Execution" and naming Mark S. Moir, Maurice P. Herlihy, Quinn A. Jacobson, Shailender Chaudhry, and Marc Tremblay as inventors; and application Ser. No. 10/621,072, filed Jul. 16, 2003, entitled "Software Transactional Memory for Dynamically Sizable Shared Data Structures," and naming Mark S. Moir, Victor M. Luchangco and Maurice Herlihy as inventors, now U.S. Pat. No. 7,328,316, which issued Feb. 5, 2008.

BACKGROUND

1. Field of the Invention

The present invention relates generally to coordination amongst execution sequences in a multiprocessor, and more particularly, to techniques for coordinating access to a transactional memory space.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Such assurances have often been provided by using locks to prevent other threads from accessing the data affected by an ongoing operation. Unfortunately, the use of locks gives rise to a number of well known problems, both in terms of software engineering and in terms of performance. First, the right "balance" of locking must be achieved, so that correctness can be maintained, but the use of a particular lock does not prevent access to an unnecessary amount of unrelated data (thereby causing other threads to wait when they do not have to). Furthermore, if not used carefully, locks can result in deadlock, causing software to freeze up. While well documented, these and other problems are pervasive in concurrent programming, and addressing them often results in code that is complicated and expensive.

A further limitation exhibited by software that employs locks as a coordination mechanism is that, no matter how carefully used, lock implementations typically have the problem that if a thread is delayed (e.g., preempted) while holding a lock, then other threads must wait for at least the duration of that delay before being able to acquire that lock. In general, operating systems and other runtime environments cannot avoid this problem because they cannot accurately predict how long a particular lock will be held, and they cannot revoke the lock without jeopardizing correctness.

Transactional memory is a paradigm that allows the programmer to design code as if multiple memory locations can be accessed and/or modified in a single atomic step. As typically defined, a transactional memory interface allows a programmer to designate certain sequences of operations as "transactions," which are guaranteed by the transactional memory implementation to either take effect atomically and in their entirety (in which case we say they succeed), or have no externally visible effect (in which case we say that they fail). Thus, in many cases, it is possible to complete a multi-target operation with no possibility of another thread observing partial results, even without holding any locks. The transactional paradigm can significantly simplify the design of concurrent programs.

In general, transactional memory can be implemented in hardware, with the hardware directly ensuring that a transaction is atomic, or in software that provides the "illusion" that the transaction is atomic, even though in fact it is executed in smaller atomic steps by the underlying hardware. See e.g., M. Herlihy and J. Moss, *Transactional Memory Architectural Support for Lock-Free Data Structures*, In Proceedings of the 20th International Symposium in Computer Architecture, pp. 289-300 (1993); N. Shavit and D. Touitou, *Software Transactional Memory*, Distributed Computing, Special Issue (10): 99-116 (1997).

Transactional memory is widely recognized as a promising paradigm for allowing a programmer to make updates to multiple locations in a manner that is apparently atomic, while addressing many of the problems associated with the use of locks. However, certain classes of algorithms and concurrent shared objects may not be well suited to transaction memory, at least as conventionally defined. For example, transactional operations on dynamically-sized data structures (e.g., lists, trees, etc.) may not be well-suited given the substantial working set exposure accumulated in traversal of large structures. Similarly, transactional operations that perform significant computations but which can fail on a condition (e.g., buffer full) whose eventual removal or satisfaction does not necessarily undermine the validity of the prior computations, may not be well-suited to transaction memory, as conventionally defined. Accordingly, modifications to the transactional interface and corresponding exploitations for concurrent software and shared objects are desired.

SUMMARY

Transactions may invest significant computational effort, e.g., processing information read from locations that form at least part of a read set of the transaction. However, for some transactional sequences and some states of the transactional memory space, all that effort may be for naught, because a simple condition remains unsatisfied at the instant the transaction attempts to complete (and thereafter commit). For example, an output buffer may be full. A general motivating example is a transaction that removes (e.g., dequeues, pops, cuts, etc.) an item from one data structure (e.g., a queue, stack, tree, etc.), processes it somehow and introduces a result into a target data structure. If the target data structure cannot receive the result, e.g., because it is full, then in a conventional transactional memory, the transaction aborts and restarts.

It has been discovered that an early release facility may be provided in transactional memory designs and that, if provided, such an early release facility can allow for transaction software constructs that wait on removal (or satisfaction) of a condition that would otherwise result in transaction abort. Absent such a facility, the act of checking the condition would typically introduce a corresponding location (or locations) into the read set of the transaction, and a subsequent modification of that location (or locations) that removed (or satisfied) the condition, would result in abortion of the blocked transaction. By employing an early release facility such as described herein, a transaction may release the location (or locations) corresponding the condition, retry, and once the transient condition is removed (or satisfied), complete and commit. In this way, computation effort may be conserved while still employing a rather simple and convenient coordination facility.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

A versatile mechanism has been developed for coordinating amongst threads of a multithreaded computation that employs a transactional memory facility with early release capabilities. In general, transactional memory with early release may be implemented as part of a memory subsystem (e.g., using hardware and/or other facilities not entirely visible to application code executing on a processor), using software constructs that provide the illusion of a transactional memory (e.g., via a defined calling interface for transactional access), or using a hybrid system that combines hardware and software support.

In such cases, the transactional memory with early release may be viewed (e.g., by software that exploits it) in terms of an interface. That interface may, in general, be implemented using any of a variety of appropriate transaction encodings (e.g., using a defined calling interface, using distinct transactional instructions defined by an instruction set architecture, ISA; using extensions, modifiers, or hints supplied in conjunction with otherwise non-transactional instructions of an ISA; using portions of an addressable memory space defined, or definable, as subject to transactional access constraints; etc.). In general, appropriate transaction encodings are matters of design choice. For clarity of illustration, we have chosen to explain our techniques in the context of an illustrative computational system which employs transactional instructions defined by an instruction set architecture. However, nothing herein should be interpreted as a limitation on suitable computational systems, on suitable transactional memory interfaces or on suitable encodings, protocols or mechanisms for indicating an early release. Indeed, we describe herein software constructs suitable for use with transactional memory implementations that employ a variety of techniques for indicating early release including both an explicit release technique and a time-to-live encoding.

Similarly, many software mechanisms, concrete algorithms, data structures and concurrent shared object exploitations may exploit an early release facility to allow a transactionally-defined sequence to wait on removal (or satisfaction) of a condition that would otherwise result in transaction abort. Again, for clarity of illustration, and without limitation, we have chosen to explain our techniques in the context of an illustrative transaction that employs a bounded queue. Of course, other types of transactions employing or operating on or with other mechanisms, algorithms, data structures and concurrent shared objects are also envisioned. In general, any transaction that expends computational effort that may be wasted due to a condition that, though important to completion of the transaction, does not implicate the correctness of the computation or consistency of computational states is a candidate. A classic example is a transaction that fails (or rather would otherwise fail) due to unavailable space in an output buffer or other data structure. Accordingly, and without limitation, we explain our techniques in the context of a transaction that reads output buffer state, and upon detection of a full buffer condition, releases the location(s) read in ascertaining the full buffer condition and retries. Typically, a transaction so defined can successfully complete and commit despite the modification, e.g., by another transaction or mechanism, of output buffer state (e.g., making space available by dequeuing items or growing the buffer).

Therefore, in view of the above, and without limitation, certain illustrative exploitations of the inventive techniques are described with particular attention to an illustrative transactional memory interface and software exploitation. Such illustrative interfaces and exploitations should be viewed only as useful descriptive context, as the invention is defined solely by the claims that follow.

Transactional Memory

Figure 1:
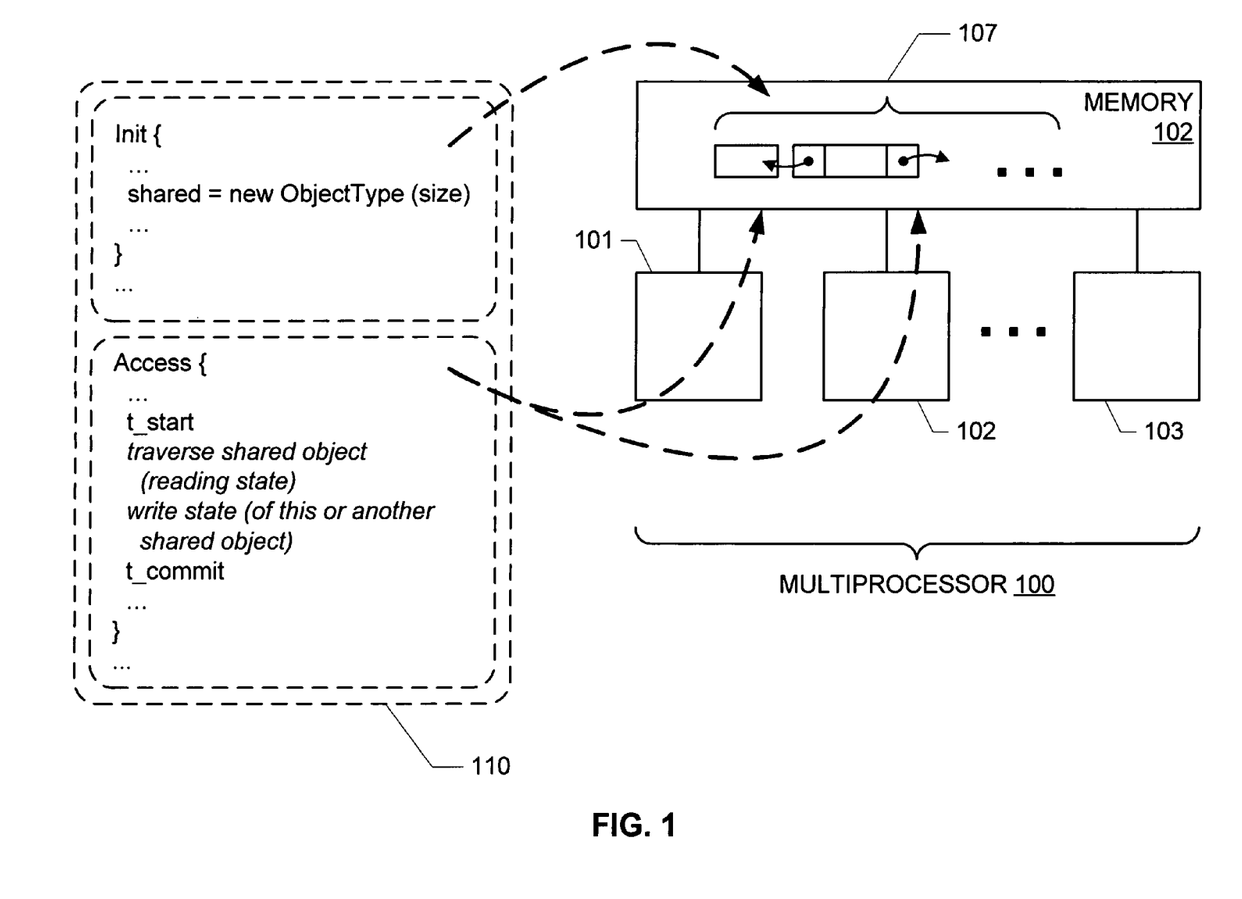
FIG. 1 depicts an exemplary multiprocessor on which techniques in accordance with present invention may be exploited.

A multiprocessor is a computer in which multiple processors are configured to execute cooperative computations, typically communicating through a shared memory. A thread is an execution sequence (e.g., a program or distinct thread or strand of execution thereof) that executes for a relevant period on a single one of the processors. FIG. 1 depicts an exemplary multiprocessor 100 including multiple processors 100, 102 ... 109, and a memory 102 of which at least a portion is shared or sharable by two or more of the processors. Memory 102 may comprise a computer-readable medium selected from the set of a disk, tape or other magnetic, optical, or electronic storage medium. Memory 102 may include an encoding of a software mechanism, the encoding comprising one or more shared data structures 107 and/or programs as exemplified by pseudocode 110. A given program (e.g., threads of execution corresponding to illustrated pseudocode 110) may execute on multiprocessor 100 as plural cooperating threads. Similarly a thread of execution corresponding to a first program may cooperate with a thread of execution corresponding to a second program. Threads typically manipulate data structures (e.g., data structure 107) that reside in memory (e.g., in one or more physical stores corresponding to memory 102). For simplicity of illustration, hierarchies of storage (e.g., levels of cache and memory) typical of modern processor architecture are not specifically illustrated. A thread modifies or observes a shared data structure by executing a sequence of instructions. Often, there is a need to execute such a sequence atomically, so that the instructions are not interleaved with instructions of any other thread that is modifying or observing the same data structure.

One technique known in the art for implementing atomicity is to associate a lock with the shared data structure. A lock is typically a memory location that can be atomically modified or examined by a thread. Before a thread can access an object, it must acquire a lock by atomically changing the lock from a free state to a busy state. A thread releases a lock by atomically changing the lock from busy back to free.

Nevertheless, it is known that locks have certain disadvantages, including poor performance when the number of concurrent threads is high, and the difficulty of designing and maintaining software that uses large numbers of locks.

An alternative approach known in the art is to provide support for light-weight transactions. A transaction is a finite sequence of machine instructions, executed by a single thread, satisfying the following properties:

Linearizability: Transactions appear to execute serially, meaning that the steps of one transaction never appear to be interleaved with the steps of another. If transaction A finishes before transaction B starts, then transaction A appears to have executed before B.

Atomicity: Each transaction makes a sequence of tentative changes to shared memory. When the transaction completes, it either commits, making its changes visible to other threads (effectively) instantaneously, or it aborts, causing its changes to be discarded.

For clarity of description, we assume here that a thread executes only one transaction at a time, although the model can be extended to permit overlapping or logically nested transactions. Based on the description herein, persons of ordinary skill in the art will recognize suitable extensions.

Each transaction has a read set, which is the set of memory locations from which it has read, and a write set, the set of memory locations to which it has written. Two transactions A and B are said to conflict if:

the read set of one overlaps the write set of the other; or
the write set of one overlaps the write set of the other.

One way to ensure that transactions remain linearizable is by optimistic synchronization: if a conflict between two transactions is detected at runtime, one of the two transactions is aborted and restarted. There are many variations on this approach: one could use a variety of techniques to decide which transaction to abort, or one transaction could block waiting for the other to resolve the conflict by committing. The techniques disclosed herein are independent of such considerations.

A transaction is viable if no conflicts have occurred. A transaction will commit if and only if it is viable at the time it attempts to commit.

To make our discussions concrete, we assume the processor architecture provides the following special instructions.

t_start starts a transaction. It takes as an argument a label to jump to if the transaction is aborted, e.g., because of a conflict with another transaction.

t_load reads a word from memory t_store writes a word to memory t_commit tries to commit the current transaction t_abort aborts the current transaction.

Various possible ways are known in the art to design a computer architecture that supports transactional memory. For purposes of exposition, we will outline our examples assuming a rather simple architecture. However, based on the description herein it will be clear to those skilled in the art that our techniques can be applied to more complex architectures as well. Furthermore, as previously noted, some embodiments in accordance with the present invention may build, in part, on software transactional memory implementations. In such embodiments, special instructions may not necessarily be supported by the processor architecture itself. Instead, functions, method or other callable sequences providing similar semantics may be employed. Nonetheless, for clarity of illustration, and without loss of generality, we illustrate using the following simple processor architecture that supports transactional memory.

Modern processors typically have one or more levels of caches, which are specialized high-speed memories that hold values recently read from or written to memory. In a conventional cache architecture that does not support transactions, each cache entry typically includes the following fields: the memory address to which the entry corresponds, the value read or written, and a status value that indicates whether the cache entry is invalid (not currently in use), shared (the same entry may be cached at other processors) or exclusive (the same entry may not be cached at other processors). If the entry is exclusive the status also indicates whether the entry is dirty, meaning that the cached value is not the same as the value in memory, and must be written back to memory before the cache entry can be reused, or clean, meaning that the cached value is the same as the value in memory, and need not be written back.

If processor P wants to write to memory location a currently cached at processor Q, then P must invalidate Q's entry for a. If that entry is dirty, Q must write that value back to location a. Once Q's entry is invalidated, its status becomes invalid.

This basic architecture can be extended to support transactions as follows. The status field for each cache entry is extended to indicate whether the entry is transactional, meaning that it has been read or written by a transaction. Each thread also has a transaction status register, which indicates whether that thread is currently executing a transaction. In practice, each processor has only one active transaction at any time, and the transaction status is in a register of the processor. The register contains active while a transaction is in progress, and becomes inactive when a transaction commits or aborts. A conflict occurs whenever a transactional cache entry is invalidated. Invalidating a transactional entry changes the transaction status register to from active to aborted. An active transaction may commit only if its status register is active. Committing a transaction causes each transactional cache entry to be marked non-transactional, with those entries written by the transaction becoming dirty, and those read and not written becoming shared. Aborting a transaction causes each transactional entry to be invalidated.

If a transaction reads or writes too many locations to fit in the cache, then the overflow items may be written to a victim cache, or the transaction may simply abort. Either way, it is desirable to minimize the number of distinct memory locations read or written by a transaction.

Illustrative Transactions

We now describe some limitations of the basic transactional memory architecture illustrated above in the context of particular transactions. Transactional operations on dynamically-sized data structures (e.g., lists, trees, etc.) present one set of challenges that we seek to address. In particular, concurrency can be severely limited by conflicts in the transactional location working sets of concurrently executing transactions that access such a data structure. Another set of challenges relates to transactional operations that perform significant computations but which can fail on a condition (e.g., buffer full) whose eventual removal or satisfaction does not necessarily undermine the validity of the prior computations. In each case, an early release facility can be employed to improve concurrency. We illustrate each in turn.

Dynamically-Sized Data Structures

Consider a sorted linked list where each list node has two fields: an integer key and a pointer to its successor, as illustrated by the code that appears below.

```
typedef struct node_s {
   node_t *next;
   int key;
} node_t;

node_t *prey; // before target node node_t *curr; // target node
```

Assume, for purposes of this example, that list nodes are sorted in ascending order by key, that the first and last keys are special minimum and maximum values never searched for or inserted, and that keys are never duplicated.

It will be clear to those skilled in the art that if a key is present in the list, then a find procedure such as illustrated by the exemplary code below will locate the node containing that key, store that node's address in the curr variable, and store that node's predecessor's address in the prey variable. Moreover, the procedure will return 0 if it does not find the key, and a non-zero value otherwise.

```
int find(node_t *head, int searchKey) {
   int currKey;
   prey=head;
   curr=(node_t*)t_load(&head->next);
   currKey=(int)t_load(&curr->key);
   while (currKey <searchKey) {
      prey=curr;
      curr=(node_t*)t_load(&curr->next);
      currKey=(int)t_load(&curr->key);
   }
   return currKey==searchKey;
}
```

Similarly, a remove procedure, such as illustrated below, executes a transaction that takes a list and a search key. If the key is present in the list, it removes the node containing that key from the list and returns that node's address. If the key is not present in the list, it returns a NULL address.

```
node_t *remove (node_t *head, int searchKey) {
   node_t *next;
   retry:
   t_begin(retry);
   if (!find(head, searchKey)) {
      t_abort( ); // do not retry
      return NULL;
   }
   next=(node_t *)t_load(&curr->next);
   t_store(&prev->next, next);
   t_store(&curr->next, NULL);
   t_commit( )
   return curr;
}
```

Based on the preceding code, it will be clear to those skilled in the art that concurrently executed transactions, while correct, have substantial practical limitations. The main problem is that the remove transaction's read set includes all the list nodes from the start of the list up to and including the list element holding the desired key. If the key is not present, then the read set consists of the entire list. This is troublesome for two reasons:
- such a large read set ensures that concurrent transactions accessing the list will conflict, eliminating the possibility of concurrent access, and increasing the likelihood of synchronization conflicts.
- such a large read set may strain hardware resources, increasing the likelihood that transactional entries will overflow the cache.

These outcomes are particularly troublesome because there is no logical reason two transactions deleting distinct elements should conflict, and because if the list is too large, it will be impossible to update it using a transaction, even if there are no synchronization conflicts. Later, we describe software constructs that exploit an early release facility of an extended transactional memory implementation to address the above-described design challenges.

Wait on Condition

Another limitation can be illustrated in the context of an implementation of a bounded first-in-first-out queue object. The queue can be represented (as illustrated below) by a structure with the following fields: buffer is an array of 16 integers, head is the index of the first occupied slot, if any, and size is the number of items in the queue. The isEmpty and isFull procedures respectively check whether the queue is empty or full, and the enq and deq procedures respectively insert a value at the front of the queue and remove the value at the end of the queue. Note that it is the responsibility of the caller to test whether the queue is full before calling enq, and to test whether the queue is empty before calling deq. The following code provides a concrete framework for our discussion.

```
#define SIZE 16
#define MASK (SIZE-1)

typedef struct queue_s {
   int buffer[SIZE];
   int head; // index of first occupied slot
   int size; // number of occupied slots
} queue_t;

int is Empty(queue_t *queue) {
   return t_load(&queue->size)==0;
}
int is Full(queue_t *queue) {
   return t_load(&queue->size)==SIZE;
} void enq(queue_t *queue, int value) {
   int head, size, index;
   size=(int)t_load(&queue->size);
   head=(int)t_load(&queue->head);
   index=(head+size) & MASK;
   t_store(&queue->buffer[index], (void *)value);
```

```
    t_store(&queue->size, (void *)(size+1));
}
int deq(queue_t *queue) {
    int head, size, index, value;
    size=(int)t_load(&queue->size);
    head=(int)t_load(&queue->head);
    index=head & MASK;
    value=(int)t_load(&queue->buffer[index]);
    t_store(&queue->head, (void *)(head+1));
    t_store(&queue->size, (void *)(size-1));
    return value;
}
```

Building on the preceding implementation of a shared queue, a simple procedure, process, is illustrated below. The simple procedure uses a transaction to dequeue an item from one queue, process it somehow, and enqueue the result on another queue. For simplicity of presentation, we assume the first queue is always non-empty, but the second queue might be full, so before pushing an item onto the second queue, the application checks whether that queue is full. If so, the application aborts and restarts the transaction.

```
/*
 * atomically dequeue, process, and enqueue value
 */
void process(queue_t *q0, queue_t *q1) {
    int value, newValue;
retry:
    t_start(retry);
    value=deq(q0); // assume non-empty
    newValue=transform(value); // expensive transformation
    if (is Full(q1)) {// is there room?
        t_abort( ); // no, abort and retry
        goto retry;
    }
    enq(q1, newValue); // yes, enqueue and commit
    t_commit( );
}
```

Unfortunately, this program structure is wasteful because aborting and restarting the transaction discards all the processing work on the dequeued value. Instead, it might be more efficient for the transaction to wait for the second queue to become non-full before proceeding. The difficulty is that once the transaction has examined the second queue's size, its size field is part of the transaction's read set, and any subsequent modification to that field (caused by removing a value) will abort the blocked transaction. As before, an early release facility would allow us to address these design challenges.

Software Exploitations of Transactional Memory with Early Release

Both of the previously illustrated problems can be solved if there were some way for a transaction to release a memory location from its read set, so that subsequent modifications to that location would not cause a synchronization conflict. As previously' noted, our techniques may be applied in transactional memory environments in which transactional access is mediated at least in part by hardware (e.g., using facilities of a memory subsystem), by software (e.g., using a software transactional memory interface) or using some combination of the two. For clarity, we illustrate in the context of a transactional memory interface that includes instructions (whether distinct or coded as variants on conventional instructions) that direct operation of a hardware transactional memory implementation. Based on this description, persons of ordinary skill in the art will appreciate suitable interfaces for transactional memory interfaces defined (at least in part) by software. For breath of illustration, and without limitation, we describe two candidate interfaces: a time-to-live interface and an explicit release interface.

Candidate Interface—Time to Live

One set of potential designs for specifying early release builds on the concept of releasing a transactional location from the working set of a transaction at a somewhat predetermined future time or coincident with a future event. In some implementations in accordance with the present invention, we allow transaction code to specify a time-to-live for particular transactionally-mediated loads and/or stores. For example, in some implementations, we specify a number of events through which a transactional location that is introduced into a working set of a transaction, should remain in the working set. Specially defined load and/or store operations may be employed to define a time-to-live. Parameterized load and/or store instructions that include a time-to-live (TTL) in a field of the instruction word (or as an operand) may also be defined. Alternatively, an operative time-to-live may be specified by use of another mechanism and applied to transactional loads and/or stores. In addition, instruction extension mechanisms (including hints) may be employed. In general, such decisions are matters of design choice and, based on the description herein, selections suitable for a given design will be appreciated by persons of ordinary skill in the art.

Just as a variety of codings may be employed for specifying the initiation of a time-to-live interval, many possible mechanisms exist for aging a particular transactional location. Such mechanisms may have explicit coding in transaction code or, in some realizations, may be implicit in operation of the transaction environment. For example, the transactionally-mediated "life" of a given transactional location may be advanced by executions of a defined instruction (e.g., a release instruction). Alternatively, aging could be implicit in executions of other instructions (e.g., transactional loads or stores) or implicit is some other operation (e.g., a defined number of instruction cycles) or measure.

Clarity of description, and indeed ease of programming, is likely greatest where we specify "time-to-live" using specially coded load and/or store instructions and advance "time" explicitly through executions of release operations. Accordingly, we now describe an illustrative time-to-live style interface, using the following instructions:

t_release—If the transaction is viable, this instruction causes certain memory locations in the current transaction's read set to be released, as described below.

t_loadn—This instruction (where n is an integer ranging from 1 to an architecture-specific upper bound) reads a memory location on behalf of the current transaction. This location will be released from the transaction's read set at the n-th subsequent call to t_release.

t_storen—This instruction (where n is an integer ranging from 1 to an architecture-specific upper bound) writes a memory location on behalf of the current transaction. At the n-th subsequent call to t_release, this location will be released from the transaction's write set, and the store will treated like a non-transactional store issued at the time of the t_release call.

The t_storen instructions are useful for "benevolent side-effects", where a transaction wants to record metering or debugging information.

Regarding the treatment of memory locations that are accessed by multiple ones of the above instructions during a single transaction, a variety of design choices are possible. For example, a time-to-live specified by later accesses may override that specified by earlier accesses. Alternatively, a maximum of remaining time-to-live and that later specified may be applied. Other formulations are also possible and persons of ordinary skill in the art may select an appropriate treatment based on design factors particular to their implementations. For the purposes of illustrating our techniques, we have only specified the behavior of transactions in which each memory location is accessed at most once by a transaction.

Application to Dynamically-Sized Data Structures

To illustrate the use of a time-to-live style interface, let us first revisit the linked-list example. The code that follows shows a revised version of the find ( ) procedure that employs transactional load instructions (t_load2) that specify a time-to-live of two release cycles.

```
int find(node_t *head, int searchKey) {
    int currKey;
    prev=head;
    curr=(node_t *)t_load2(&(head->next));
    currKey=(int)t_load2(&curr->key);
    while (currKey<searchKey) {
        prev=curr;
        curr=(node_t *)t_load2(&curr->next);
        currKey=(int)t_load2(&curr->key);
        t_release( )
    return currKey==searchKey;
}
```

This procedure uses t_load2 operations to read each node's contents. It ensures that at any time the transaction's read set includes both the node being examined and its predecessor. All previous nodes are released from the read set. This discipline ensures that the node being examined cannot be removed from the list by a concurrent transaction because the previous node's next field belongs to the current transaction's read set. Notice the use of t_load2 instead of t_load allows concurrent transactions to remove non-adjacent nodes without provoking synchronization conflicts.

While the illustrated code is for a singly-linked list-type data structure, extensions to release back-pointers in a doubly-linked lists (and similar data structures) are straightforward and will be appreciated by persons of ordinary skill in the art. Similarly, applications to descending (i.e., non-retracing) access of tree or tree-like data structures are also straightforward. Retracing access (if mediated using reverse, i.e., ascending, pointers) is also straightforward. In general, data structures and access methods for which traversal allows information encoded in previously traversed elements to be forgotten (i.e., eliminated from the read set of the transaction) are all suitable candidates for implementation using time-to-live style release techniques. For simplicity, we presume that all release executions advance "time" for all time-parameterized transactional loads (and perhaps stores). However, certain types of dynamically-sized data structures (e.g., skip-lists) may benefit from multiple independent release sequences that may be applied to age different types (e.g., levels) of pointers. Alternatively skip lists and other more complex data structures and/or access patterns may benefit from an explicit address formulation of release described later herein.

Application to Transaction that may Profitably Wait on a Condition

Next, we revisit the bounded queue example. Here, we alter the isFull procedure to use t_load1, and we alter the process procedure so that if it discovers the second queue is full, it releases the size field from its read set and repeatedly rereads the queue size without aborting and restarting the transaction, and without discarding the work it has performed so far.

```
#define SIZE 16
#define MASK (SIZE-1)
typedef struct queue_s {
    int buffer[SIZE];
    int head; // index of first occupied slot
    int size; // number of occupied slots
} queue_t;

int isFull(queue_t *queue) {
    return t_load1(&queue->size)==SIZE;
}
/*
 * atomically dequeue, process, and enqueue value
 */
void process(queue_t *q0, queue_t *q1) {
    int value, newValue;
retry:
    t_start(retry);
    value=deq(q0); // assume non-empty
    newValue=transform(value); // expensive transformation
    while (isFull(q1)) {// is there room?
        t_release( )// release
        /* wait/backoff, then retry */
    }
    enq(q1, newValue); // enqueue and commit
    t_commit( );
}
```

Notice that the use of t_load1 (and subsequent t_release) instead of t_load allows concurrent transactions to remove one or more nodes from q1 and update size without necessarily provoking synchronization conflicts. By releasing the transactional location corresponding to queue->size from the read-set of a transaction, the process procedure allows the transaction to wait on satisfaction of the output buffer not full condition (! isFull(q1)). Since appropriate retry timing will, in general, be application-specific, no particular backoff or other timing technique is specifically shown. However, based on the description herein, persons of ordinary skill in the art may readily incorporate an appropriate backoff, delay or timing technique.

As with the previous example of early-release exploitations for transactions that access dynamically-sized data structures, exploitations of an early-release facility for transactions that may profitably wait on a condition are not limited to the full output buffer scenario illustrated. Indeed, the technique may more generally be employed to wait on satisfaction (or removal) of any condition that does not implicate the correctness of the transaction. In general, these conditions amenable to such treatment are application specific and the techniques we describe may be employed as appropriate by persons of ordinary skill in the art.

Supporting Modifications to a Cache Architecture

We now describe one possible set of modifications to the previously described cache architecture, which may be employed in support of transactional instructions such as those described above. For ease of presentation, we assume the simple cache architecture described above, although it will be appreciated by one skilled in the art that these modifications are applicable to a range of different designs.

Let l be the largest integer for which an architecture supports t_loadn. We add a time-to-live (TTL) field to each cache entry's status. Typically, each word or separately addressable location in a cache line will have an associated TTL field. This field's value ranges from 0 to l−1. A t_load or t_store call sets that entry to any other distinguished value (perhaps l) that indicates that the entry remains transactional for the lifetime of the transaction. A t_loadn or t_storen call fills the cache entry just as before, except that it sets the time-to-live field to n−1. Each time a viable transaction calls t_release, a non-zero time-to-live field for any such entry is decremented. If the time-to-live field is zero, that entry is marked as non-transactional, and treated as if it had been filled by a non-transactional instruction. For example, if the entry was filled by t_loadn, then it becomes valid, and if it was filled by t_storen, then it becomes dirty. Invalidating such an entry does not abort the current transaction. Note that the time-to-live fields of Cache entries filled by t_load or t_store instructions are not decremented by t_release calls.

For clarity, we have omitted other possible transitions, such as the transitions that occur when a value loaded for transactional reading is reloaded for transactional writing. Typically, exclusive states (resulting from store operations) would be expected to dominate. Similarly, transitions appropriate in the case of a first time-to-live parameterized transactional access followed by a second targeting the same location (or cache line), e.g., a t_load1 (&location) following a t_load2 (&location), are implementation dependent or matters of design choice. In general, persons of ordinary skill in the art will select transitions appropriate to their implementation.

Candidate Interface—Address-Specific Release

An alternative interface is to instead provide a single instruction, t_release_addr, that takes an address as an argument and removes a transactional location corresponding to that address from the current transaction's read or write set. Given such an interface, time-to-live denominated transactional load and store operations may typically be omitted and timing of release for a location previously introduced into a transactional working set by operation of a t_load or t_store instruction is coded by placement of a corresponding t_release_addr in execution sequence of the implemented transaction. For certain classes of data structures and/or algorithms, an address-specific release mechanism may prove more powerful or flexible. For example, as previously described, in data structures in which release sets may be data or execution sequence dependent and not predictable in advance, an address-specific release mechanism may facilitate exploitation of our techniques.

In general, a time-to-live interface may be more convenient for regular data structures in which significant numbers of locations may be released in correspondence with a particular step in traversal of the data structure. However, less regular dynamically-sized structures may benefit from the address-specific release. A given transactional memory implementation may support both mechanisms, if desired.

Referring back to our previous description of supporting modifications to a cache architecture, the t_release_addr instruction can be implemented simply by resetting the cache entry for that address to be non-transactional. Per-word or per-location tracking is desirable, particularly for implementations that support the t_release_addr instruction. Time-to-live tracking need not be provided unless desired.

Application to Dynamically-Sized Data Structures

To illustrate the use of an explicit-release interface, we revisit the linked-list example. The code that follows shows a revised version of the find ( )procedure that employs address specific release instructions (t_release_addr). In the ated code, loads are assumed to be transactional. However, alternative implementations may explicit code the transactional loads (e.g., using a t_load instruction, an appropriate function or the like).

```
int find(node_t* head, int searchKey) {
    int currKey;
    last=NULL;
    prey=head;
    curr=(node_t *)head->next;
    currKey=curr->key;
    while (currKey>searchKey) {
    if (last !=NULL) {
        t_release_addr(&last->next);
        t_release_addr(&last->key);
    }
    last=prey;
    prey=curr;
    curr=(node_t *)curr->next;
    currKey=curr->key;
    }
    return currKey==searchKey;
}
```

Operation of the revised find( )procedure will be understood in the context of our prior discussion.

Application to Transaction that may Profitably Wait on a Condition

To further illustrate the use of an explicit-release interface, we revisit the bounded queue example. The code that follows shows a revised version of the process( ) procedure that employs address specific release instructions (t_release_addr). As before, loads are assumed to be transactional. However, alternative implementations may explicitly code the transactional loads (e.g., using a t_load instruction, an appropriate function or the like).

```
#define SIZE 16
#define MASK (SIZE−1)
typedef struct queue_s {
    int buffer[SIZE];
    int head; // index of first occupied slot
    int size; // number of occupied slots
} queue_t;
int is Full(queue_t* queue) {
    return queue->size==SIZE;
}
/*
 * atomically dequeue, process, and enqueue value
 */
void process(queue_t* q0, queue_t* q1) {
    int value, newValue;
    retry:
    chkpnt retry;
    value=deq(q0); // assume non-empty
```

```
newValue=transform(value); // expensive transformation
    while (is Full(q1)) {// is there room?
        release(q1->size); // release and retry}
    }
    enq(q1, newValue); // enqueue and commit
    commit;
}
```

Operation of the revised process( ) procedure will be understood in the context of our prior discussion.

Exploitations of the Developed Techniques

Figure 2:
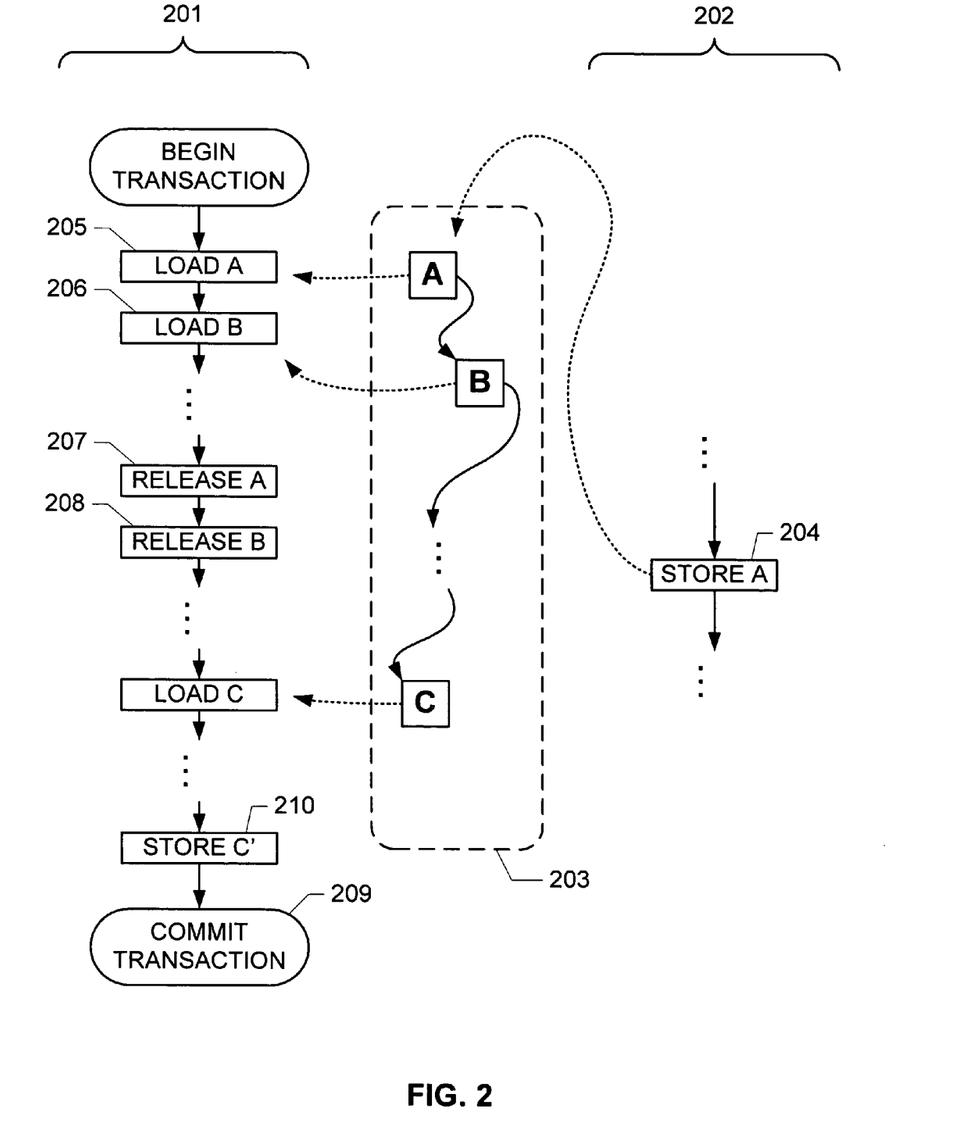
FIG. 2 illustrates transactional techniques in accordance with some embodiments of the present invention as applied to a dynamically-sized data structure instantiated in storage shared by at least two cooperating threads or processes.

FIG. 2 provides a generalized illustration the techniques described herein as applied to a dynamically-sized data structure instantiated in storage shared by at least two cooperating threads or processes. In particular, FIG. 2 illustrates a first thread (or process) 201 that implements a transaction and a second thread (or process) 202, each accessing a dynamically-sized data structure instantiated in memory 203, and which includes transactional locations corresponding to elements A, B C of the dynamically-sized data structure. The second thread 202 typically implements a transaction, although it is possible that its behavior (e.g., store 204) is not mediated by a transaction mechanism.

Turning to the first thread 201, two load operations (205, 206) are illustrated, which are generally suggestive of operations (possibly including a lengthy sequence of operations) that traverse dynamically-sized data structure. Note that, for purposes of this generalization, neither the particular structure of elements of the dynamically-sized data structure nor the topology of the dynamically-sized data structure itself is particularly important. The particular dynamically-sized data structure may implement a simple list or may represent a more complex and/or irregular structure. In any case, first thread 201 traverses the dynamically-sized data structure and, in the process, loads information from transactional locations thereof, including e.g., elements A and B. At some point (207, 208), using facilities described herein, transactional locations corresponding to elements A and B are released from a working set of such locations associated with the implemented transaction. Building on the various realizations described above, it will be clear that such release may be triggered by a variety of mechanisms, including expiration of a previously set time-to-live (e.g., in response to execution of a requisite number of operations such as t_release or the like) and/or responsive to a explicit location targeted release mechanism (e.g., employing an operation such as t_release_addr or the like).

In any case, at some time after the release of the transactional location (or locations) corresponding to element A, the second thread 202 executes an instruction that modifies contents of a previously released location(s) corresponding to element A. Note that absent operation of the early release mechanisms described herein, we would expect that the transaction implemented by the first thread 201 would fail. However, based on the prior release of location(s) corresponding to element A, the transaction implemented by the first thread 201 may successfully commit (at 209).

Although any number of possible transactions may benefit from these techniques, the further operations of FIG. 2 are illustrative. In particular, transaction implemented by the first thread 201 continues to traverse the dynamically-sized data structure, eventually reaching an element C thereof, which it modifies. Perhaps, first thread 201 implements a transaction that traverses a large dynamically-sized data structure, eventually finding an element thereof (e.g., element C) that matches a search criterion. Content(s) of element C is (are) updated (210) and the transaction successfully completes.

Second thread 202 may implement a second transaction (possibly a transaction having the same semantics as the first) which performs an update to an element of dynamically-sized data structure, wherein the updated element was along a traversal path of the transaction implemented by first thread 201. By employing the early release techniques described herein, we may allow both transactions to successfully commit.

Figure 3:
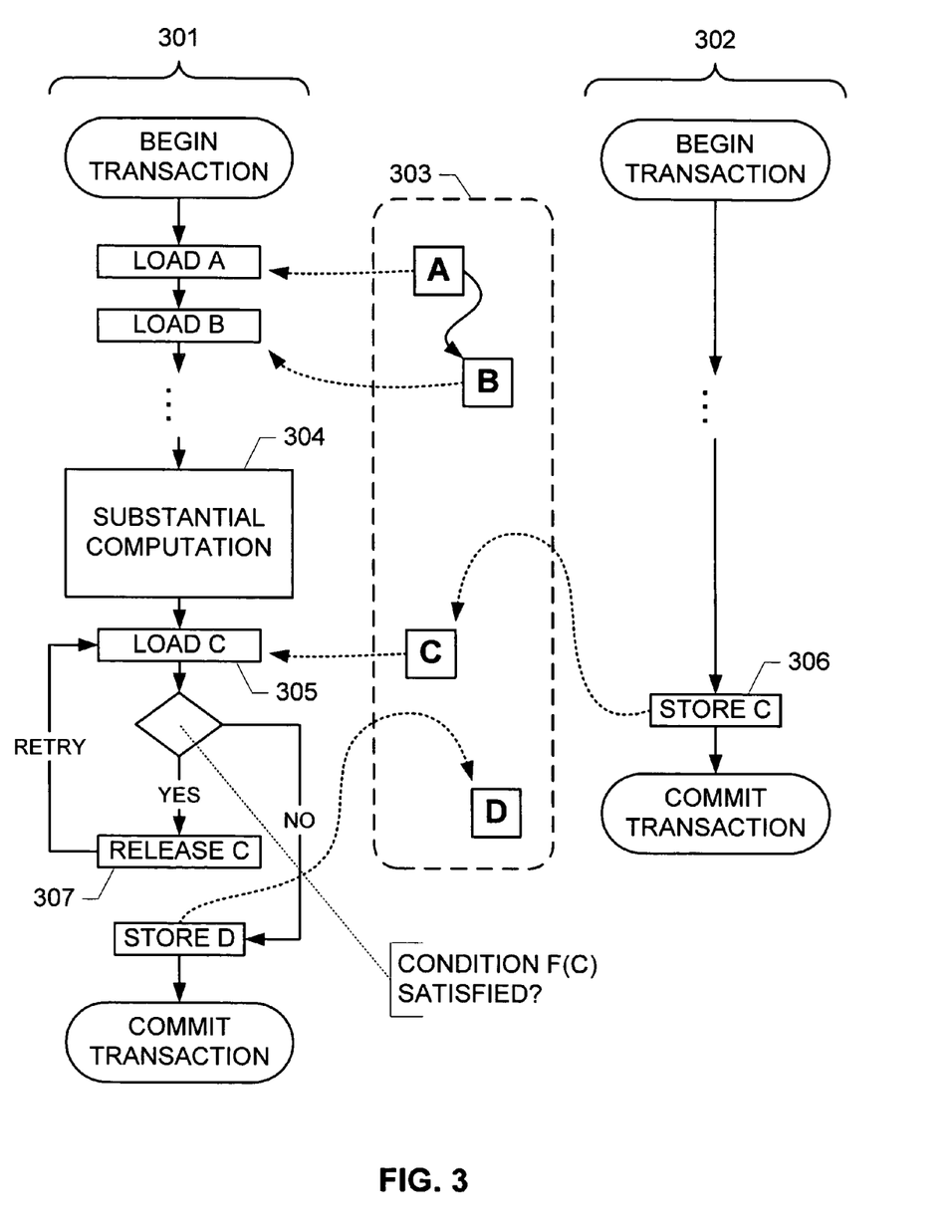
FIG. 3 illustrates transactional techniques in accordance with some embodiments of the present invention as applied to a transaction that may wait on a condition satisfied (or removed) by operation of another transaction.

FIG. 3 similarly generalizes the techniques described herein as applied to a transaction that may wait on a condition satisfied (or removed) by operation of another transaction. In particular, FIG. 3 illustrates a first thread (or process) 301 that implements a first transaction and a second thread (or process) 302 that implements a second transaction, each accessing a memory 303, and which includes transactional locations corresponding to elements A, B, C and D of one or more data structures. In some exploitations (including the bounded queue type examples previously illustrated) elements A and B may correspond to a first data structure and elements C and D may correspond to a second data structure; however, more generally, fewer or greater numbers of data structures may be implicated.

In any case, the first transaction implemented by first thread 301 performs some substantial computation 304 for which we would like to avoid wasted computational effort. Successful completion and committing of the first transaction depends on some condition that is a function of information stored in one or more transactional locations corresponding to element C. In some sequences and/or states of the computational system, state of element C is not (yet) compatible with completion and eventual commit of the first transaction. As previously illustrated, state corresponding to element C may be a full state of a bounded output queue (e.g., element C may encode size of the bounded queue and element D may correspond to a position in that bounded queue). However, more generally, the one or more transactional locations corresponding to element C may encode any condition (or conditions) upon which the first transaction may profitably wait and which the second transaction may satisfy.

As before, ordinarily and absent the early release facilities described herein, we would expect the transaction implemented by the first thread 301 to fail because transactional load 305 introduces a transactional location corresponding to element C into the working set (read set) of the first transaction and transactional store 306 modifies that transactional location. However, in the retry sequence illustrated, the first transaction releases (307) the transactional location corresponding to element C, thereby allowing the second transaction to update the transactional location corresponding to element C and thereby satisfy (or remove) the condition without conflict with the first transaction. As before, it will be clear that release may be triggered by a variety of mechanisms, including expiration of a previously set time-to-live (e.g., in response to execution of a requisite number of operations such as t_release or the like) and/or responsive to a explicit location targeted release mechanism (e.g., employing an operation such as t_release_addr or the like).

Although any number of possible transactions may benefit from these techniques, the further operations of FIG. 3 are illustrative. After the condition corresponding to element C is satisfied, the first transaction eventually stores into one or more transactional locations corresponding to element D. Thereafter, the first transaction may successfully commit despite the fact that the second transaction modified transactional locations that were (at one or more times) in the course of first transaction in a working set of locations thereof. In some exploitations, element C may correspond to a guard condition on a data structure that includes element D. For example, element C may correspond to representation state (e.g., full) of a target data structure (e.g., a bounded queue) that includes element D. In some exploitations, elements C and D may be unrelated. Furthermore, while some exploitations may transactionally access locations (e.g., locations A and B) in preparation for, or as part of, a substantial computation 304, other exploitations need not include any transactional access to shared memory prior to condition check 305. For example, substantial computation 304 may include an expensive transformation (e.g., of a pseudorandom seed). Of course, substantiality of substantial computation 304 is, in general, application- and environment-specific. Furthermore, the techniques described herein may be exploited irrespective of whether some computation objectively qualifies as substantial.

Transactional Memory Implementations

This application discloses novel extensions (including early release facilities) to transactional memory interfaces and implementations and related software constructs that exploit the extended transactional memory. These extensions support non-blocking access to data structures of unbounded size, while consuming only bounded hardware resources. These extensions also permit transactions to pause for bounded durations waiting for conditions to become true. In general, suitable transactional memory interfaces and implementations may be provided in hardware, in software or in a combination of the two. For purposes of the present invention, any of a variety of transactional memory interfaces and/or implementations may be employed.

Exemplary Hardware Transactional Memory Environments

Figure 4:
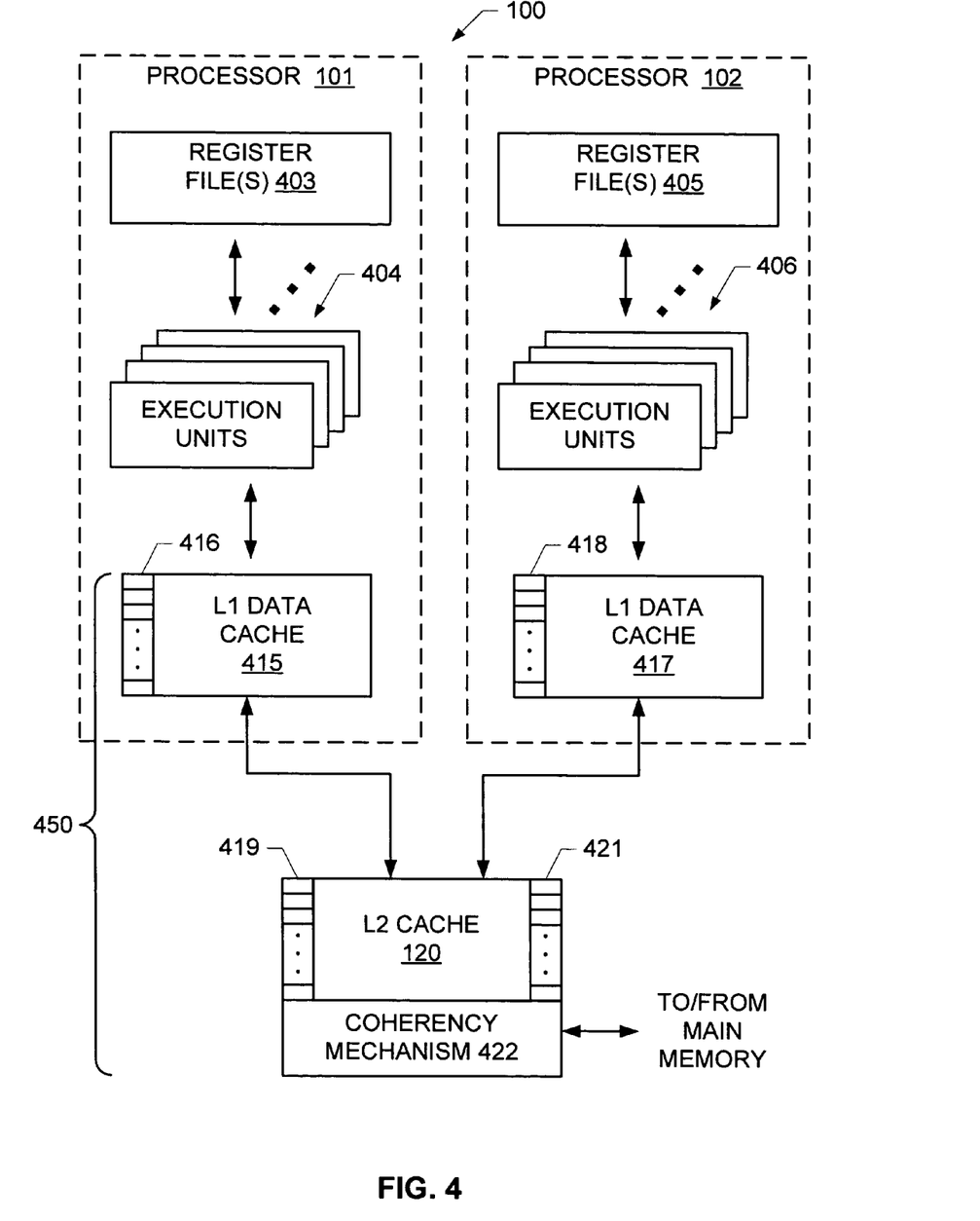
FIG. 4 depicts one exemplary processor architecture in which transactional memory support with early release functionality is provided, in part, through extensions to a cache architecture for use with some embodiments of the present invention.

In some exploitations, an underlying hardware transactional memory architecture may be employed in support of the early release facilities described above. FIG. 4 illustrates one such architecture, consistent with the previous illustrations and examples, in which transactional memory support is provided, in part, through extensions to a cache architecture. While the techniques described herein are not limited to exploitation in any particular hardware transactional memory environment, or for that matter, to exploitation in hardware-mediated transactional memory, several suitable hardware transactional memory implementations are detailed in the following commonly-owned, co-pending U.S. patent application Ser. No. 10/439,911, filed 16 May 2003, now U.S. Pat. No. 7,216,202, which issued May 8, 2007, entitled "Method and Apparatus for Avoiding Locks by Speculatively Executing Critical Sections" and naming Shailender Chaudhry, Marc Tremblay and Quinn A. Jacobson as inventors; Ser. No. 10/764,412, filed 23 Jan. 2004, now U.S. Pat. No. 7,089,374, which issued on Aug. 8, 2006, entitled "Selectively Unmarking Load-Marked Cache Lines during Transactional Program Execution" and naming Marc Tremblay, Quinn A. Jacobson, Shailender Chaudhry, Mark S. Moir and Maurice P. Herlihy as inventors; and U.S. Pat. No. 7,206,903, which issued on Apr. 17, 2007, entitled "Method and Apparatus for Releasing Memory Locations During Transactional Execution" and naming Mark S. Moir, Maurice P. Herlihy, Quinn A. Jacobson, Shailender Chaudhry, and Marc Tremblay as inventors.

While the above-referenced applications detail several suitable hardware transactional memory environments, we summarize with reference to FIG. 4 certain aspects of at least one suitable hardware transactional memory environment, which may facilitate understanding of the techniques described herein. In particular, we briefly describe load-marking and store-marking of cache lines (or words thereof) to support conflict detections previously described. Turning then to FIG. 4, one possible implementation of a hardware transactional memory environment that provide early release functionality includes processors 101 and 102 and a level 2 (L2) cache 420, which may be coupled to main memory (not shown). Processor 102 is similar in structure to processor 101, so only processor 101 is described below.

Processor 101 includes one or more register file(s) 403 and one or more functional units 404, e.g., arithmetic units, load/store units, floating point units and/or other specialized functional units. In general, such functional units can be used in performing computational operations involving operands retrieved from register file(s) 403. In some realizations, load and store operations utilize respective load buffers and store buffers (not specifically shown) coupled between the functional units and the L2 cache. In some implementations, both an "active register file" and a backup "shadow register file" are provided to facilitate check pointing. In some implementations, processor 101 provides a flash copy operation that instantly copies all of the values from register file 403 into register file 404. These features can facilitate a rapid register check pointing operation, e.g., at or following start of a transaction sequence.

Processor 101 additionally includes a level one (L1) data cache 415, which stores data items that are likely to be used by processor 101. Note that lines in L1 data cache 415 include load-marking indications 416, which indicate that a corresponding data value (e.g., an associated cache line or word) has been loaded during transactional execution. These load-marking indications 416 are used to determine whether interfering memory references take place during transactional execution. Single-bit load marking may be employed in some implementations, although for time-to-live based interfaces, sufficient additional bits should be provided to support "time" encodings supported by the implementation. See the preceding description of t_loadn and t_storen encodings for examples.

Processor 101 may also include an L1 instruction cache (not shown). Suitable determinations will be understood based on the preceding general disclosure of transactional memory operation and early release. To support atomic commitment of all changes made by a transaction, such changes may be recorded in a store buffer; stores in this buffer are not released to memory system 450 until the transaction completes without encountering a conflicting access that causes it to abort.

In general, load-marking can take place at any level cache, such as L2 cache 420, or even in an independent structure. However, for performance reasons, the load-marking will typically take place at the cache level that is as close to the processor as possible, which in this case is L1 data cache 415. L2 cache 420 operates in concert with L1 data cache 415 (and a corresponding L1 instruction cache) in processor 101, and with L1 data cache 417 (and a corresponding L1 instruction cache) in processor 102. Load-marking indications 416 and 418 should be defined at a level of granularity suitable for the particular early release interface provided. Typically, per-word or per-addressable-location marking is suitable.

In addition to the load marking facilities described, store marking indications are also provided in the illustrated cache architecture. Elements (typically lines) in L2 cache 420 have associated store-marking indications 419 that indicate that a data value has been stored to the element (line) during transactional execution. Store-marking indications are used to determine whether interfering memory references take place during transactional execution. Note that, while convenient for write through L1 cache configuration illustrated, store-marking does not necessarily have to take place in L2 cache 420. Ideally, the store-marking takes place in the cache level closest to the processor where cache lines are coherent. For write-through L1 data caches, writes are automatically propagated to L2 cache 420. However, if an L1 data cache is a write-back cache, store-marking may be provided in the L1 data cache.

Exemplary Software Transactional Memory Environments

While hardware implementations may provide certain performance advantages, an underlying software transactional memory implementation may also be employed in support of the early release facilities described herein. For example, one such suitable implementation is described in commonly-owned, co-pending U.S. patent application Ser. No. 10/621,072, filed Jul. 16, 2003, now U.S. Pat. No. 7,328,316, which issued Feb. 5, 2008, entitled "Software Transactional Memory for Dynamically Sizable Shared Data Structures," and naming Moir, Luchangco and Herlihy and inventors. U.S. Pat. No. 7,328,316 is incorporated herein by reference.

Portions of the incorporated patent application describe a release function tm_release that operates to release a block of storage previously opened for transactional access, and which may be employed to support the techniques described herein. Based on the description herein, persons of ordinary skill in the art will appreciate suitable adaptations of the early release interfaces described herein to conform with those described in U.S. patent application Ser. No. 10/621,072, now U.S. Pat. No. 7,328,316, which issued Feb. 5, 2008, or vice versa. In general, the dynamic software transactional memory support described in the above-incorporated U.S. Patent Application provides powerful way to reduce conflicts between transactions. Before a transaction commits, it may release an object that it has opened in READ mode by invoking the release ( ) method. Once an object has been released, other transactions accessing that object do not conflict with the releasing transaction over the released object.

Other Embodiments

While the invention(s) is(are) described with reference to various implementations and exploitations, it will be understood that these embodiments are illustrative and that the scope of the invention(s) is not limited to them. Terms such as always, never, all, none, etc. are used herein to describe sets of consistent states presented by a given computational system, particularly in the context of correctness proofs. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to particular concurrent shared objects and particular implementations thereof have been described in detail herein, applications to other shared objects and other implementations will also be appreciated by persons of ordinary skill in the art. In addition, more complex shared object structures may be defined, which exploit the techniques described herein. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s).

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A computer-implemented method, comprising:
a first thread executing on a first processor to perform a shared-memory transaction using a transactional memory mechanism, wherein said performing the shared-memory transaction comprises:
the first thread reading contents of a shared-memory location, wherein in response to said reading, the transactional memory mechanism adds the shared-memory location to a read-set of the transaction and wherein the transactional memory mechanism is configured to monitor the read-set of the transaction for conflict with one or more other threads;
the first thread determining that the contents of the shared-memory location do not satisfy a given condition, and in response, releasing the shared-memory location previously introduced into the read set of the transaction, wherein said releasing does not include aborting or committing the transaction, and in response to said releasing, the transactional memory mechanism removes the shared-memory location from the read-set of the transaction;
after the releasing, a second thread executing on a second processor modifying the contents of the shared-memory location;
after the modifying, the first thread reading the modified contents and
determining that they satisfy the given condition, and in response, executing a section of code of the transaction, wherein said reading the modified contents reintroduces the shared-memory location into the read set;
subsequent to said executing the section of code, committing the transaction.

2. The method of claim 1, further comprising:
the first thread repeatedly releasing the shared-memory location and re-reading its contents until said determining that the contents satisfy the given condition.

3. The method of claim 1,
wherein the transactional memory mechanism employs hardware transactional memory.

4. The method of claim 3,
wherein at least some accesses to transactional memory locations are mediated using a software transactional memory construct.

5. The method of claim 1,
wherein the transactional memory mechanism defines an interface that provides early release of transactional memory locations from transaction read sets.

6. The method of claim 1,
wherein the first thread reading contents of the shared-memory location includes
the thread executing a transactional load operation that is executable to read contents of a shared-memory location and to indicate that the memory location should be monitored by the transactional memory mechanism.

7. The method of claim 1,
wherein the releasing includes executing a release operation that identifies the transactional memory location to be removed from the read set.

8. The method of claim 1,
wherein the releasing includes executing a release operation that, coincident with an Nth execution thereof, removes the released transactional memory location from the read set.

9. The method of claim 8,
wherein N is indicated to the transactional memory mechanism by execution of an
operation that specifies a number of succeeding operations for which the shared-memory location should be monitored as a read-from transactional memory location.

10. The method of claim 1,
wherein the first thread reading contents of the shared-memory location includes executing an operation that indicates to the transactional memory mechanism a number of succeeding operations for which a memory location should be monitored by the transactional memory mechanism.

11. The method of claim 10,
wherein the succeeding operations are release operations.

12. The method of claim 10,
wherein the indicating operation is a transactional load operation that reads contents of a memory location and indicates that the memory location should be monitored by the transactional memory mechanism.

13. The method of claim 1,
wherein the committing includes executing a transaction commit operation.

14. The method of claim 1, further comprising:
prior to said reading contents of a shared-memory location, the first thread performing substantial computations on transactionally accessed data and avoiding transaction abort and waste of at least part of the substantial computations by performing said releasing.

15. The method of claim 1,
wherein-the first and second threads are parts of a cooperative computation.

16. The method of claim 1,
employed to allow the transaction to release fewer than all shared-memory locations of its read set and retry access to a released one of the transactional locations without being aborted by a second thread that modifies the previously released shared-memory locations.

17. The method of claim 16,
further employed to allow the transaction to wait on a condition satisfied by the modification.

18. A computer-readable medium storing program instructions executable by a plurality of processors to perform a shared-memory transaction utilizing a transactional memory mechanism, wherein said performing the shared-memory transaction comprises:
the first thread reading contents of a shared-memory location, wherein in response to said reading, the transactional memory mechanism adds the shared-memory location to the a read-set of the transaction and wherein the transactional memory mechanism is configured to monitor the read-set of the transaction for conflict with one or more other threads;
the first thread determining that the contents of the shared-memory location do not satisfy a given condition and in response, releases the shared-memory location, wherein said releasing does not include aborting or committing the transaction and wherein in response to said releasing, the transactional memory mechanism removes the shared-memory location from the read set of the transaction;
after said releasing, the thread repeating said reading the contents of the
shared-memory location and releasing of the shared-memory location until the thread determines that the contents satisfy the given condition, wherein said repeating is performed without the transaction being aborted or committed, wherein said repeating said reading reintroduces the shared-memory location into the read set.

19. The computer-readable medium of claim 18, wherein at least one instance of said releasing is performed using hardware transactional memory.

20. The computer-readable medium of claim 18, wherein at least one instance of said releasing is performed software transactional memory.

21. The computer-readable medium of claim 18, wherein said performing the shared memory transaction further comprises executing at least one invocation of a location specific release mechanism.

22. The computer-readable medium of claim 18, wherein said performing the shared memory transaction further comprises executing at least one invocation of a release mechanism that decrements time-to-live of plural shared-memory locations including the shared-memory location.

23. The computer-readable medium of claim 18, wherein the program instructions comprise:
a functional encoding of the transaction.

24. The computer-readable medium of claim 18,
wherein said performing the shared memory transaction further comprises introducing plural shared-memory locations corresponding to plural addressable elements of a data structure into the read set of the transaction.

25. The computer-readable medium of claim 24,
wherein the data structure comprises a concurrent shared object and at least some of the plural addressable elements correspond to instantiated elements of a data structure implemented by the concurrent shared object.

26. The computer-readable medium of claim 25, wherein the data structure is instantiable in transactional memory.

27. The computer-readable medium of claim 25, wherein the data structure is instantiated in transactional memory.

28. A computer-readable storage medium storing program instructions executable by a plurality of processors to implement:
a first thread performing a shared-memory transaction using a transactional memory mechanism, wherein said performing the shared-memory transaction comprises:
the first thread reading contents of a shared-memory location, wherein in response to said reading, the transactional memory mechanism adds the shared-memory location to a read-set of the transaction and wherein the transactional memory mechanism is configured to monitor the read-set of the transaction for conflict with one or more other threads;
the first thread determining that the contents of the shared-memory location do not satisfy a given condition and in response, releasing the shared-memory location from the read set of the transaction, wherein said releasing does not include aborting or committing the transaction and in response to said releasing, the transactional memory mechanism removes the shared-memory location from the read-set of the transaction;

after said releasing, a second thread modifying the contents of the shared-memory location wherein said modifying does not cause the transaction to be aborted; and the first thread reading the modified contents of the shared-memory location and determining that they satisfy the given condition, and in response, executing a section of code of the transaction wherein said reading the modified contents of the shared-memory location reintroduces the released shared-memory location into the read set of the transaction;

subsequent to said executing the section of code, committing the transaction successfully.

29. The computer-readable storage medium of claim 28, wherein said modifying the contents of the shared-memory location is performed by the second thread as part of a second shared-memory transaction.

30. The computer-readable storage of claim 28, wherein, the programs instructions are further executable to implement: the first thread repeatedly reading and releasing the contents of the shared-memory location until the condition is satisfied.

31. The computer-readable storage medium of claim 28, wherein the shared-memory location corresponds to an instantiated element of a data structure instantiable in transactional memory.

32. A computer system, comprising:

a plurality of processors;

a shared-memory coupled to the plurality of processors and storing program instructions to perform a shared-memory transaction utilizing a transactional memory mechanism, wherein said performing the shared-memory transaction comprises:

the first thread reading contents of a shared-memory location, wherein in response to said reading, the transactional memory mechanism adds the shared-memory location to a read-set of the transaction and wherein the transactional memory mechanism is configured to monitor the read-set of the transaction for conflict with one or more other threads;

the first thread determining that the contents of the shared memory location do not satisfy a given condition and in response, releasing the shared-memory location, wherein said releasing does not include aborting or committing the transaction and wherein in response to said releasing, the transactional memory mechanism removes the shared-memory location from the read set of the transaction;

after said releasing, the thread repeating said reading the contents and releasing of the shared-memory location until the thread determines that the contents satisfy the given condition, wherein said repeating is performed without the transaction being aborted or committed, and wherein said repeating said reading reintroduces the shared-memory location into the read set.

33. The computer system of claim 32, wherein at least one instance of said releasing is performed using hardware transactional memory.

34. The computer system of claim 32, wherein at least one instance of said releasing is performed using software transactional memory.

35. The computer system of claim 32, wherein said performing the shared memory transaction further comprises executing at least one invocation of a location specific release mechanism.

36. The computer system of claim 32, wherein said performing the shared memory transaction further comprises executing at least one invocation of a release mechanism that decrements time-to-live of plural shared-memory locations including the shared-memory location.

37. The computer system of claim 32, wherein the program instructions comprise a functional encoding of the transaction.

38. The computer system of claim 32, wherein said performing the shared memory transaction further comprises introducing plural shared-memory locations corresponding to plural addressable elements of a data structure into the read set of the transaction.

39. The computer system of claim 38, wherein the data structure comprises a concurrent shared object and at least some of the plural addressable elements correspond to instantiated elements of a data structure implemented by the concurrent shared object.

40. The computer system of claim 39, wherein the data structure is instantiable in transactional memory.

41. The computer system of claim 39, wherein the data structure is instantiated in transactional memory.

\* \* \* \* \*